June 10, 1958     L. N. ALLEN, JR     2,838,376

REGENERATION OF SPENT PICKLE LIQUORS

Filed Feb. 24, 1953     2 Sheets-Sheet 1

INVENTOR
LOUIS N. ALLEN, JR.
BY
ATTORNEY

June 10, 1958 L. N. ALLEN, JR 2,838,376
REGENERATION OF SPENT PICKLE LIQUORS
Filed Feb. 24, 1953 2 Sheets-Sheet 2
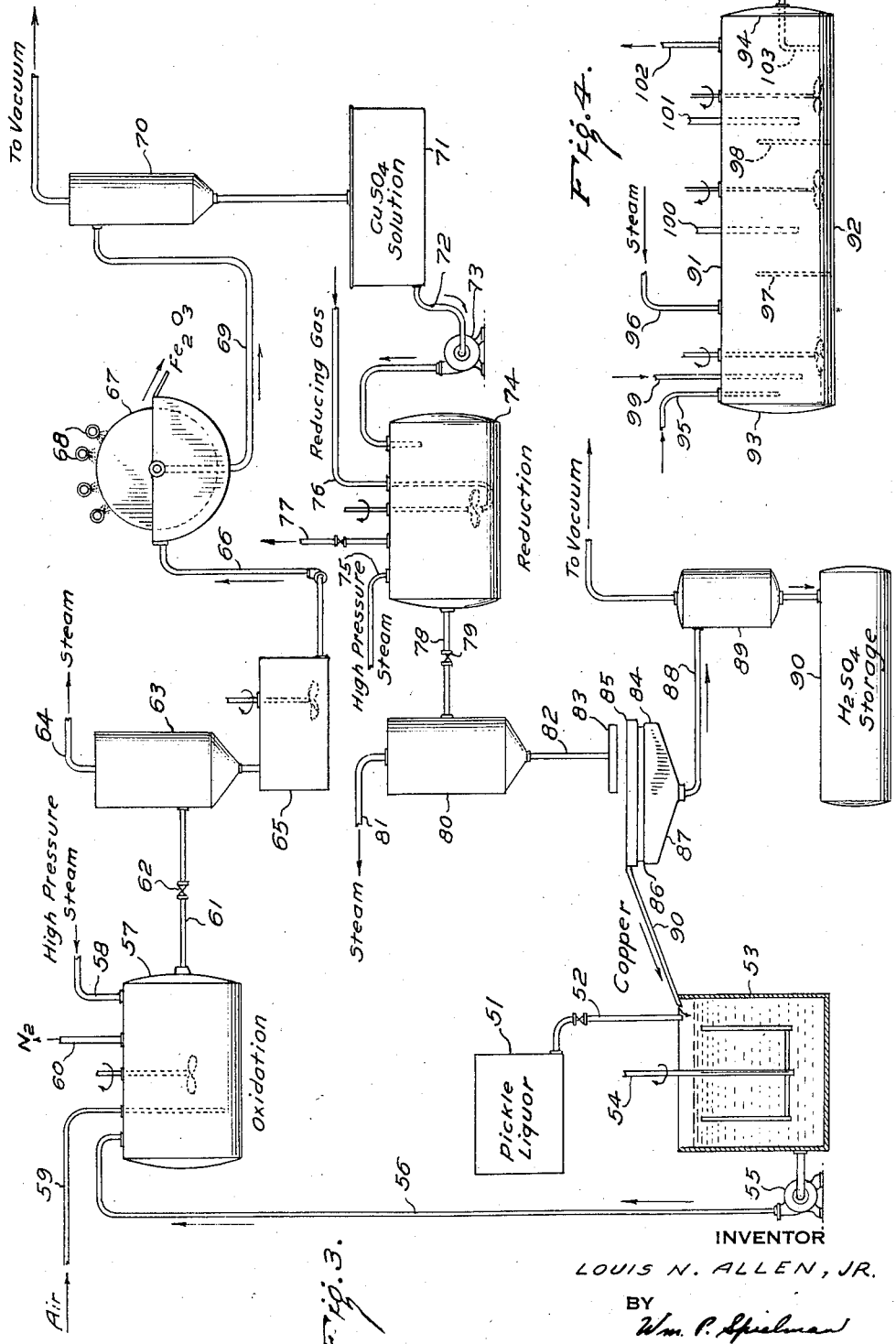
INVENTOR
LOUIS N. ALLEN, JR.
BY
Wm. P. Spielman
ATTORNEY

United States Patent Office 2,838,376
Patented June 10, 1958

2,838,376

REGENERATION OF SPENT PICKLE LIQUORS

Louis N. Allen, Jr., Short Hills, N. J., assignor to Chemical Construction Corporation, New York, N. Y., a corporation of Delaware Application February 24, 1953, Serial No. 338,191

12 Claims. (Cl. 23—200)

This invention relates to a method and apparatus for the regeneration of aqueous ferrous sulfate liquors for the recovery of iron oxide and aqueous sulfuric acid therefrom. The invention includes the method, as hereinafter fully described, and preferred forms of apparatus wherein this method can be carried out.

The problem of recovering sulfuric acid values from aqueous ferrous sulfate liquors is encountered in many industries. Foremost amongst these, at least on the basis of volume, are the regeneration of spent pickle liquors and of the aqueous ferrous sulfate-sulfuric acid solutions resulting from the digestion of ilmenite and other titanium-containing materials with sulfuric acid in the manufacture of titanium dioxide pigments. Waste iron sulfate liquors from the reduction of nitrobenzene to aniline with iron and sulfuric acid also constitute a problem in the dyestuff industry. Similar liquors are also obtained in the leaching of iron ores with sulfuric acid. The process of my invention is applicable generally to aqueous iron sulfate or iron sulfate-sulfuric acid liquors resulting from industrial processes where iron is dissolved in sulfuric acid, including the above-mentioned processes in particular.

The difficulties encountered in treating waste solutions of the above type are readily apparent from a consideration of the spent pickle liquors resulting from the pickling of iron and steel in sulfuric acid. Regeneration of these liquors requires the removal of part or all of the iron in a commercially valuable form, preferably iron oxide, and recovery of the sulfate values as a sulfuric acid sufficiently pure to permit its reuse in the pickling operation. This means that a sulfuric acid relatively free from excessive quantities of dissolved iron must be produced, and preferably one of about 10–15% $H_2SO_4$. The process of my invention is well suited for the treatment of pickle liquors, since it satisfies both of these requirements.

My invention is based on the concept of converting aqueous ferrous sulfate solutions into iron oxide and sulfuric acid by the use of copper; i. e., of metallic copper, copper oxide, copper sulfide or mixtures thereof. I have found that the iron sulfate in such solutions can be converted into iron oxide by mixing copper therewith, followed by oxidation of the mixture. When ferrous sulfate liquors are treated the oxidation reaction that takes place is as follows:

(1)   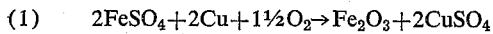

This reaction can be carried out in the presence of aqueous sulfuric acid concentrations up to about 8% $H_2SO_4$. Somewhat higher concentrations of sulfuric acid can be tolerated by using higher oxidation temperatures and pressures, but at acid concentrations above 15% there is a tendency for copper sulfide to form. However, since this is a reactive form of copper, its presence in admixture with the copper can be tolerated, and therefore in some cases such high concentrations of free sulfuric acid may be used. When the oxidation is conducted at the elevated temperatures and pressures hereinafter described, the iron oxides are precipitated in the form of a dense black crystalline solid, resembling $Fe_3O_4$, that can easily be settled out and removed from the copper sulfate solution.

Substantially all of the iron can be precipitated by the above reaction, provided the proper quantities of copper are used. Ordinarily the quantity of copper is the stoichiometric equivalent of the amount of iron present; however, when the concentration of sulfuric acid is higher than about 8% it is advisable to add sufficient additional copper to reduce the concentration of free acid at least to this amount and preferably to around 5% or less. Where removal of all of the dissolved iron is unnecessary it will be understood that smaller proportions of copper, equimolecular in amount to the iron to be recovered, may be used; in this case the remainder of the iron will pass through the regeneration process and will be returned to the pickling solution.

In order to recover the copper values from the copper sulfate solution in a form in which they can be reused in the process, the copper sulfate is subjected to a reducing step whereby it is converted into copper and sulfuric acid. Any suitable reduction process may be employed; for example, the solution may be electrolyzed by passage of a low voltage direct current therethrough, whereby the copper is plated out on a cathode. I greatly prefer, however, to reduce the copper sulfate in the solution by reacting it with a reducing gas, such as hydrogen, carbon monoxide or mixtures thereof, since this precipitates the copper in a finely divided and highly reactive form. The second part of my process is therefore a reducing step wherein the copper sulfate solution from the oxidizing step is reduced to recover a part or all of the copper as reactive copper, which can be returned to the mixing and oxidation step for reuse, while simultaneously forming sulfuric acid from the sulfate radical of the copper sulfate. If desired, part or all of the recovered copper can be oxidized to copper oxide by exposing it to air or by other suitable oxidizing procedures before returning it to the ferrous sulfate oxidation; the oxidation reaction then becomes:

(1–a)   $2FeSO_4 + 2CuO + \tfrac{1}{2}O_2 \rightarrow Fe_2O_3 + 2CuSO_4$

The invention will be further described with reference to the accompanying drawings wherein:

Fig. 3 is a flow diagram illustrating particular types of apparatus and particular apparatus combinations constituting a plant for pickle liquor recovery; and Fig. 4 illustrates a multiple-chamber reactor for carrying out the oxidation or reduction steps of my process when operating on a large scale.

Figure 1:
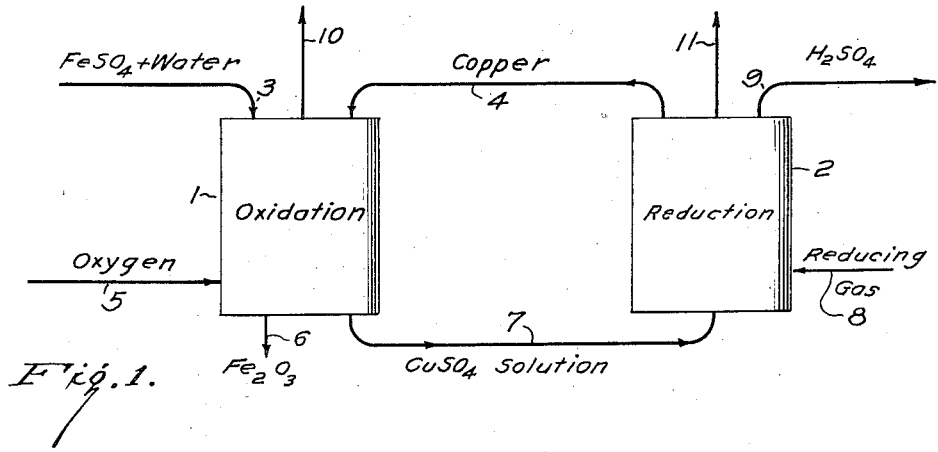
Fig. 1 is a diagrammatic illustration of an embodiment of my invention wherein the copper is recycled between the oxidation and reduction stages.

Referring to Fig. 1, the process employs an oxidation stage illustrated generally by reference numeral 1 and a reduction or copper-recovery stage indicated by reference numeral 2. Ferrous sulfate and water, with or without small amounts of sulfuric acid having a concentration of about 5% $H_2SO_4$ or less, are supplied at 3 to the oxidation stage 1 along with the desired amount of copper that is recycled from stage 2 through recycle line 4. It will be understood that while the reaction involved does not theoretically require sulfuric acid, the presence of at least a small amount of this acid at a concentration on the order of about 1–4% is desirable at the beginning of the oxidation reaction. The oxygen necessary for the conversion is introduced through line 5, either as substantially pure oxygen or as air, and the precipitated iron oxide is withdrawn through line 6. The solution of copper sulfate produced by the oxidation reaction is drawn off through line 7 and passed to the reduction stage 2, wherein it is converted into metallic copper and aqueous sulfuric acid by the action of a reducing gas introduced through line 8. The sulfuric acid is withdrawn through line 9 while the copper is preferably returned to the oxidation stage through line 4. Unreacted gases and steam are vented from the oxidation and reduction stages through lines 10 and 11 respectively.

I greatly prefer to use relatively high pressures and temperatures in the oxidation reaction to obtain a crystalline $Fe_2O_3$ precipitate and in order to carry it to completion within a reasonable time. Higher temperatures and pressures also permit the treatment of more strongly acid solutions, as has been mentioned above. Ordinarily temperatures within the range of about 425–500° F. are preferred, with corresponding pressures of about 400–800 p. s. i. g. or higher; under these conditions the reaction is completed in about 0.5–5 hours. Completion of the reaction is attained when substantially all of the added copper has been converted into copper sulfate. The reduction reaction in stage 2 also progresses much more rapidly at elevated pressures and temperatures, and since the copper sulfate is obtainable under pressure from the oxidation reaction I prefer to carry out its reduction at approximately the same pressures. Temperatures of about 425° F. to 500° F. and pressures of about 400–800 p. s. i. g. or higher are preferred for the reduction when using hydrogen, carbon monoxide or mixtures containing either or both of these gases, such as water gas, blast furnace gas, producer gas, coke oven gas and the like.

Figure 2:
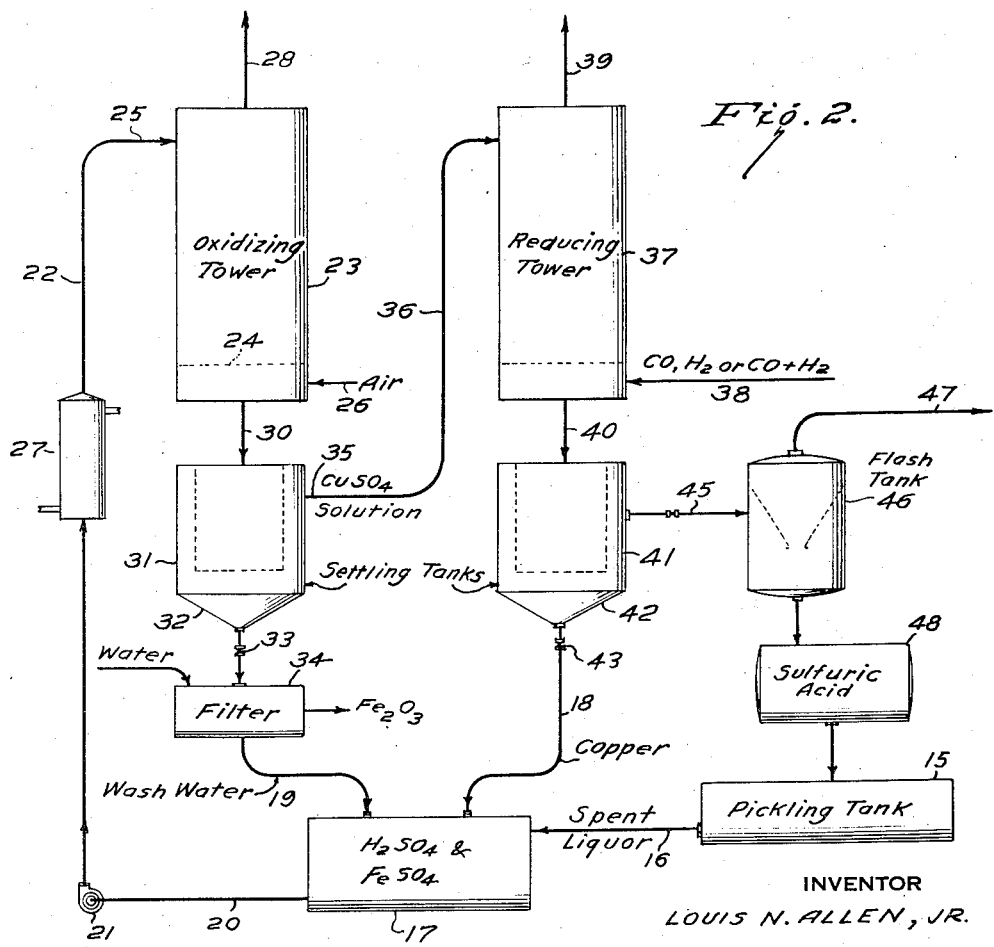
Fig. 2 is a diagrammatic illustration of an embodiment suitable for the regeneration of spent pickle liquor.

The process illustrated by Fig. 2 of the drawing represents one method which can be used for the regeneration of spent pickle liquors. As is well known, iron and steel are cleaned for scale removal by immersing them in aqueous sulfuric acid solutions which usually contain from about 2% to about 12% or more of $H_2SO_4$. Spent pickle liquors usually contain about 2–6% of $H_2SO_4$ and about 15–20% of $FeSO_4$.

Referring to Fig. 2 of the drawings, a pickling tank is illustrated diagrammatically at 15. Spent pickle liquor, having a composition within the range discussed above, is passed through line 16 to feed tank 17, where it is mixed with copper or copper oxide from line 18 and wash water from line 19. The resulting slurry is passed through line 20, high pressure pump 21 and inlet line 22 into an oxidizing tower or column 23 which is preferably a welded, pressure-resisting vessel containing packing supported on a grid 24. The incoming iron sulfate-copper slurry is introduced above the packing as at 25 and flows downwardly over the packing in countercurrent contact with air or oxygen introduced through line 26. If desired, the incoming slurry may be preheated to obtain the desired reaction temperatures by means of preheater 27, although the oxidation reaction, being exothermic, provides most of the heat required for the process. In the lower portion of column 23 the incoming gas is heated to a temperature approaching the wet bulb temperature by the outgoing slurry, while the upper portion of the column acts in a reverse manner, with the incoming slurry being heated by the rising gases. Most of the oxidation reaction takes place in the central portion of the column, where water vapors are liberated and pass out with the unreacted gases through line 28. The energy of heat and pressure in these exit gases may be recovered in any suitable equipment; thus, for example, it may be used to drive the air or oxygen compressor supplying the oxidizing gas to the line 26.

The iron oxide slurry formed in the oxidizing tower 23 passes from the base of this tower through line 30 to a settling tank 31. Inasmuch as the rate of solution of iron oxide in the copper sulfate solution is relatively slow, the tank 31 need not be a pressure-resisting vessel; however, it may be maintained at the same pressure as that of the oxidizing tower if desired. The iron oxide settles out in the conical bottom 32 of this settling tank and is discharged through valve 33 to a filter 34, where it is washed with water. The filter cake is removed and recovered as an iron oxide suitable for blast furnace use, while the wash water from the filter passes through line 19 into the feed tank 17.

In the settling tank 31, the copper sulfate-sulfuric acid solution collects above the iron oxide precipitate and may be withdrawn continuously or intermittently through a side outlet 35. From this outlet, the solution passes through line 36 to the top of a reducing tower 37, which is a packed tower similar in construction to the oxidizing tower 23. It will be understood that a high pressure pump, not shown, will be inserted in line 36 when the settling tank 31 is operated at low pressure. Reducing gas enters the base of tower 37 through line 38 and passes upwardly through the packing in countercurrent contact with the descending copper sulfate liquor, thereby converting the copper sulfate into metallic copper with a regeneration of sulfuric acid by either or both of the reactions:

(2) $\qquad CuSO_4 + H_2 = Cu + H_2SO_4$ (3) $\qquad CuSO_4 + H_2O + CO = Cu + H_2SO_4 + CO_2$

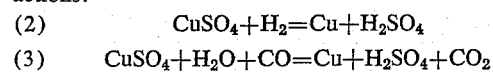

As is noted above, this operation is carried out at temperatures of 425° F. to 450° F. or higher and pressures of about 400–600 p. s. i. g. or higher. Under these conditions the time necessary for complete reduction of all the copper is about 0.5–3 hours. The reaction is exothermic, and the heat evolved generates additional steam, which passes from the column through line 39 along with unreacted gases. The slurry of finely divided metallic copper falls to the base of the tower and is passed through line 40 into a settling tank 41, which may be maintained under the same pressure and temperature conditions as those which exist in the base of the tower 37. The metallic copper settles out in the conical bottom 42 of the settling tank and passes through valve 43 and line 18 into the feed tank 17, where it mixes with additional quantities of spent pickle liquor and the mixture is returned to the oxidizing tower 23 for reuse in the process.

The separated sulfuric acid in the upper portion of settling tank 41 is blown through valved line 45 into a flash tank 46, maintained at atmospheric pressure, whereby part of its water content is converted into steam, which is drawn off through line 47. The sulfuric acid is concentrated by this flash evaporation and collects in the bottom of tank 46 and passes to a storage tank 48, from which it may be withdrawn as needed for pickling iron and steel.

In the apparatus shown in Fig. 3 of the drawing, pressure-resisting tanks of welded construction are substituted for the oxidizing and reducing towers of Fig. 2 and rotary filters are employed for removing the precipitated iron oxide and the copper sludge from the reducing step. In the process illustrated by this figure, pickle liquor from a storage tank 51 is passed through line 52 into a mixing tank 53 provided with a gate-type agitator 54 and is there mixed with the requisite quantities of copper, copper oxide, or copper sulfide obtained as hereinafter described. The resulting slurry is passed through high pressure pump 55 and line 56 into an oxidizing tank 57, wherein reaction (1), above, is carried out. The heat necessary to raise the slurry to reaction temperatures is introduced as high pressure steam through line 58, while air under pressure is passed in through line 59. When the process is carried on continuously, nitrogen and excess steam are vented through line 60, suitable means being provided to recover the heat and energy of these gases. As has previously been explained, the quantity of copper mixed with the pickle liquor and introduced into tank 57 should be the stoichiometric equivalent of the amount of iron present plus sufficient additional copper to reduce the sulfuric acid concentration to about 5% or less. The size of the tank 57 should be sufficient to insure a retention time of about 1–5 hours, depending on the temperatures and pressures employed.

Upon completion of the oxidation reaction, the copper sulfate-sulfuric acid-iron oxide slurry is blown through line 61 and reducing valve 62 into a flash tank 63 which is maintained at atmospheric pressure. The excess heat of the liquor causes the generation of large quantities of steam, which are withdrawn through line 64, while the slurry of iron oxide in the copper sulfate solution collects in a storage tank 65. From this tank it is pumped through line 66 to a rotary vacuum filter 67, where it is filtered and the filter cake is washed with water from sprays 68. The iron oxide product is collected as a dense filter cake and after drying may be mixed with iron oxide from other sources for use in a blast furnace.

The filtrate from the filter 67, consisting essentially of a solution of copper sulfate in dilute sulfuric acid, passes through line 69 to vacuum tank 70 and from there into a storage tank 71. From this source it may be withdrawn continuously or intermittently through line 72 and pumped by means of a high pressure pump 73 into a reducing tank 74 which is similar in construction and operation to the oxidizing tank 57. In tank 74 the solution is heated by high pressure steam, introduced through line 75, and its copper content is precipitated by the action of a reducing gas passing in through line 76, steam and waste gases being vented through line 77. It will be understood that the capacity of tank 74 is sufficient to provide a residence time of about 0.5–3 hours or longer, sufficient to carry reactions (2) and (3) to completion.

The slurry formed in tank 74, consisting essentially of a suspension of finely divided metallic copper in aqueous sulfuric acid solution, passes through line 78 and reducing valve 79 into a flash tank 80, from which low pressure steam is withdrawn through line 81. The slurry falls through line 82 and distributor 83 onto a circular platform filter 84, which functions to separate the precipitated copper from the aqueous sulfuric acid solution. As illustrated, the filter 84 consists essentially of a rotating table 85 supported on a ball race 86 and surmounting a vacuum chamber 87 connected by line 88 to a vacuum tank 89. The copper precipitate is removed by a suitable doctor blade, not shown, and may be passed through a trough 90 into the tank 53 for reuse in the treatment of additional quantities of pickle liquor. The sulfuric acid solution passing through line 88 into tank 89 is collected in a storage tank 90 from which it may be withdrawn for any suitable purpose, such as for reuse in pickling iron and steel.

In Fig. 4 a multiple-compartment reaction tank is shown that is particularly well suited for carrying out the oxidation or reduction reactions of the present invention. This tank, illustrated generally by reference numeral 91, consists of a cylindrical body section 92 and dished ends 93 and 94 and is preferably of welded construction. An inlet pipe 95 for the material undergoing treatment is provided, as well as a steam pipe 96 for the introduction of high pressure steam. Vertical baffles 97 and 98 divide the tank into three compartments in each of which a suitable agitator is provided. Inlet pipes 99, 100 and 101 extend into each of these compartments for the introduction of air or other oxidizing gas, when the apparatus is used for oxidation, or for the introduction of hydrogen, carbon monoxide or other reducing gases when the reduction reaction is being carried out. Steam and other waste gases are drawn off through pipe 102. The slurry undergoing treatment, being introduced through pipe 95, passes horizontally through the first reaction chamber, where it is partially reacted, and then through the second and third chambers in sequence, the passage into these chambers being over the tops of the baffles 97 and 98. The size of the equipment and the rate of introduction through line 95 are so proportioned that the material drawn off from the last reaction chamber through line 103 is reacted to the desired extent, usually after a complete conversion has been obtained. It will be understood that the provision of a unitary reactor of this type permits a substantial reduction in the cost of the equipment involved.

Many of the advantages of the process of my invention will be evident from the foregoing description of preferred embodiments thereof. The copper employed as an iron replacement or precipitant in the oxidizing step is substantially completely recovered from the reducing step in a highly reactive form for reuse in the process, so that no substantial loss of copper is entailed. The regenerated sulfuric acid is obtained at concentrations up to 10–15% $H_2SO_4$ or higher by reason of the substantial amounts of its water content that are flashed into steam when the acid is blown into the flash tank 80. If desired, this recovered acid can be further concentrated by standard concentrating procedures, as in the well-known drum concentrators, since it is relatively clean and well suited for this type of concentration.

The only additional reagents necessary are air or oxygen and reducing gases, both of which are relatively inexpensive. For example, reducing gases obtained from a blast furnace can be employed at no cost in plants operating on steel mill pickle liquors and this as well as the use of atmospheric air as an oxidizing agent entails only compression costs which can be largely offset by recovery of the energy of the waste gases given off by the process. For these reasons the value of the regenerated acid, alone, will ordinarily pay all of the operating costs of the process and, in addition, will produce a sufficient margin of profit to amortize the plant investment in about two years, after which it is obtainable as a clear operating profit.

The invention will be further illustrated by the following specific examples to which, however, it is not limited.

Example 1

A charge consisting of 29.3 parts by weight (0.1 mol) of copperas ($FeSO_4 \cdot 7H_2O$), 10 parts (0.1 mol) of sulfuric acid, 8.4 parts (0.132 mol) of copper powder and 130 parts of water was placed in an autoclave and heated to 450° F. and oxygen gas was introduced under sufficient pressure to make a total internal pressure of 800 lbs. per square inch. The heating and oxygen introduction was continued at 420°–460° F. for 1½ hours after which the charge was cooled rapidly and filtered.

The filtrate was reintroduced into the autoclave and again heated to 450° F. with the introduction of hydrogen under sufficient pressure to maintain the internal pressure at 800 lbs. per square inch. The heating and hydrogen introduction was continued for 1½ hours at 450° F. after which the charge was cooled and again filtered.

All of the iron was precipitated during the oxidation. Analysis of the precipitate showed it to contain 65.6% of iron and 0.94% of sulfur, indicating that an iron oxide of good purity was formed. Analysis of a sample of the filtrate showed an iron content of 0.006%, a copper content of 0.837% and (by titration) a free sulfuric acid content of 0.74%. All of the dissolved copper was precipitated by the reduction and was recovered in the subsequent filtration.

Example 2

Following the oxidation procedure of Example 1 a number of additional runs were made. In all cases the quantity of copperas was 29.3 parts (0.1 mol), oxygen gas was used at an internal pressure of 800 lbs. per square inch, and 130 parts by weight of water was added to the charge. The following table shows the amounts of copper and acid, the reaction time in hours and temperature in degrees F., the percent of total iron precipitated, and other results.

| Run No. | H₂SO₄, mols | Cu, mols | Reaction Temp. | Reaction Time | Percent Fe ppt. | Precipitate Analysis Cu | Precipitate Analysis S | Precipitate Analysis Fe |
|---|---|---|---|---|---|---|---|---|
| 1 | .165 | .132 | 450 | 2½ | 98.2 | 1.0 | 2.6 | 61.6 |
| 2 | .165 | .132 | 350 | 1 | 82.5 | 0.74 | | 37.7 |
| 3 | .058 | .063 | 450 | 1 | 99.9 | nil | | 66.0 |

These results show that substantially all the iron is precipitated by copper using oxidation times of about 1–2½ hours and temperatures of 400° F. or higher. At lower temperatures (Run No. 2) there is considerable formation of basic ferric sulfate.

What I claim is:

1. A method of treating aqueous ferrous sulfate solutions which comprises admixing copper therewith in a quantity at least equivalent to the amount of iron to be recovered and heating the mixture in the presence of oxygen at temperatures above 400° F. and thereby forming a dense precipitate of easily filterable, black, crystalline iron oxide and a copper sulfate solution.

2. A method according to claim 1 wherein during the oxidation the solution contains about 1% to 5% of free sulfuric acid.

3. A method of treating ferrous sulfate liquors containing more than about 8% of free sulfuric acid which comprises adding copper thereto, the amount of added copper being the molecular equivalent of the amount of iron present plus sufficient excess to reduce the content of free sulfuric acid to below about 8%, and heating the mixture in the presence of added oxygen at temperatures above 400° F. and under the corresponding autogenic pressures and thereby forming a dense precipitate of easily filterable, black, crystalline iron oxide and a copper sulfate solution.

4. A method according to claim 3 in which the iron sulfate liquor is a spent pickle liquor.

5. A method of treating aqueous ferrous sulfate solutions which comprises admixing copper therewith in a quantity at least equivalent to the amount of iron to be recovered and injecting an oxygen-containing gas into the mixture at pressures of at least 400–800 p. s. i. g. and a temperature of at least 400° F. for at least one hour and thereby forming a dense, easily fiterable, black, crystalline iron oxide precipitate and a copper sulfate solution.

6. A method according to claim 5 wherein during the oxygen injection the solution contains about 1% to 5% of free sulfuric acid.

7. A method of producing iron oxide and sulfuric acid from aqueous ferrous sulfate solutions which comprises admixing therewith an amount of copper which is at least the molecular equivalent of the amount of iron to be recovered, oxidizing the mixture at temperatures of at least 400° F. and under the corresponding autogenic pressures and thereby forming a copper sulfate solution and a dense, easily filterable, black, crystalline iron oxide precipitate, separating the iron oxide therefrom, reducing the copper sulfate in the solution and thereby converting it into copper and aqueous sulfuric acid, and recovering the copper and sulfuric acid so produced.

8. A method of producing iron oxide and sulfuric acid from aqueous ferrous sulfate solutions which comprises mixing recycled copper therewith, the amount of recycled copper being at least the molecular equivalent of the amount of iron present, oxidizing the mixture at temperatures of at least 400° F. and under the corresponding autogenic pressures and thereby forming a copper sulfate solution and a dense, easily filterable, black, crystalline iron oxide precipitate, separating the iron oxide therefrom, reducing the copper sulfate in the solution and thereby converting it into aqueous sulfuric acid and copper, drawing off and recovering the aqueous sulfuric acid, and returning the copper to the mixing step for reuse in the process.

9. A method of producing iron oxide and sulfuric acid from aqueous ferrous sulfate-sulfuric acid solutions having a sulfuric acid concentration greater than about 5% which comprises mixing recycled copper therewith, the amount of copper so recycled being the molecular equivalent of the amount of iron present plus sufficient additional copper to partially neutralize the free sulfuric acid to a concentration within the range of about 1% to 5%, oxidizing the mixture at temperatures of at least 400° F. and under the corresponding autogenic pressures and thereby forming a copper sulfate solution and a dense, easily filterable, black, crystalline iron oxide precipitate, separating the iron oxide therefrom, reducing the copper sulfate in the solution and thereby converting it into aqueous sulfuric acid and copper, drawing off and recovering the aqueous sulfuric acid, and returning the copper to the mixing step for reuse in the process.

10. A method according to claim 9 in which the iron sulfate-sulfuric acid liquor is a spent pickle liquor.

11. A method according to claim 9 wherein the copper sulfate solution is reduced by injecting a reducing gas thereinto at temperatures of at least 400° F. and under the corresponding autogenic pressures, said reducing gas being a member of the group consisting of hydrogen, carbon monoxide and mixtures thereof.

12. A method of producing iron oxide and sulfuric acid from aqueous ferrous sulfate-sulfuric acid solutions which comprises mixing recycled copper therewith and oxidizing the mixture by injecting an oxygen-containing gas thereinto at pressures of at least 400–800 p. s. i. g. and a temperature of at least 400° F. for at least one hour, the amount of recycled copper being sufficient to provide a molecular equivalent of the amount of iron present and to ensure a concentration of free sulfuric acid below about 5% during the oxidation, thereby forming a copper sulfate solution and a dense, easily filterable, black, crystalline iron oxide precipitate, separating and recovering the precipitated iron oxide, reducing the copper sulfate in the solution by injecting a reducing gas thereinto at pressures of at least 400–800 p. s. i. g. and a temperature of about 425°–500° F. for about 0.5–3 hours and thereby forming additional sulfuric acid and copper, drawing off and recovering the sulfuric acid and returning the copper to the mixing step for reuse in the process.

References Cited in the file of this patent

UNITED STATES PATENTS

| 35,509 | Dahne | June 10, 1862 |
| 234,595 | Macay | Nov. 16, 1880 |
| 763,478 | Gin | June 28, 1904 |
| 2,117,205 | Myhren | May 10, 1938 |
| 2,296,423 | Clark | Sept. 22, 1942 |
| 2,568,963 | McGauley et al. | Sept. 25, 1951 |

OTHER REFERENCES

"Chemical Engineering," vol. 56, No. 3, March 1949, pages 144–147.

Thomas, "Metallurgie," vol. 1, 8–20 (1904).

Mellor, Comprehensive Treatise on Inorganic and Theoretical Chemistry, vol. 14, 256, 265–268 (1935), Longmans, Green and Co., London.